United States Patent [19]

Reni

[11] 4,050,406
[45] Sept. 27, 1977

[54] COATING MACHINE FOR CONFECTIONERY, PHARMACEUTICALS AND SIMILAR PRODUCTS

[75] Inventor: Mario Reni, Brugherio (Milan), Italy
[73] Assignee: Reni-Cirillo S.r.l., Milan, Italy
[21] Appl. No.: 692,527
[22] Filed: June 3, 1976
[51] Int. Cl.² .............................................. B05C 5/00
[52] U.S. Cl. ...................................... 118/19; 118/20; 118/24; 118/303
[58] Field of Search ...................... 118/19, 20, 303, 64, 118/417, 24; 427/242; 259/DIG. 42, 2; 51/163.2; 209/275, 366.5; 134/156, 161, 102

[56] References Cited
U.S. PATENT DOCUMENTS

| | | | |
|---|---|---|---|
| 3,100,088 | 8/1963 | Podmore et al. | 51/163.2 X |
| 3,357,398 | 12/1967 | Gross | 118/20 X |
| 3,621,813 | 11/1971 | Zocher | 118/308 |
| 3,877,178 | 4/1975 | Campanelli | 259/DIG. 42 |
| 3,882,643 | 5/1975 | Knartzer | 51/163.2 |

*Primary Examiner*—John P. McIntosh
*Attorney, Agent, or Firm*—Birch, Stewart, Kolasch and Birch

[57] ABSTRACT

A machine for sugar coating articles of confectionery, or pharmaceutical or like products, comprises an annular receptacle having an upwardly open channel section which is resiliently mounted on a support structure so that it can be vibrated with respect to the support structure by means of a vibration generator. The articles to be sugar coated are loaded into the receptacle and vibrated together to spread the sugary substance subsequently sprayed over them. In one embodiment the annular receptacle has a mesh structure so that drying air can be blown upwardly through the articles being coated to accelerate the drying process. In another embodiment the annular receptacle is imperforate and has an arcuate auxiliary container attached thereto, which auxiliary container extends to either side of a discharge aperture of said annular receptacle and is provided with a mesh floor and its own discharge apertures.

4 Claims, 11 Drawing Figures

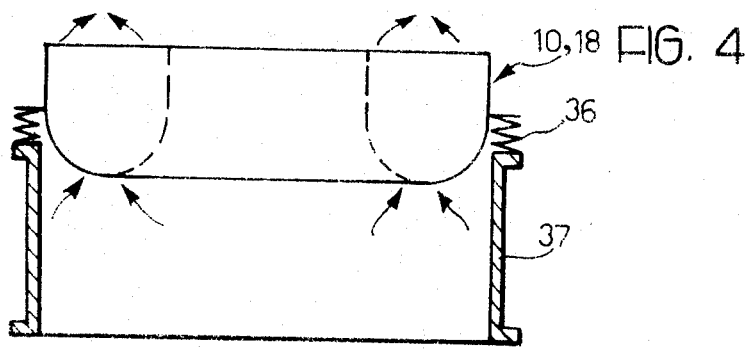
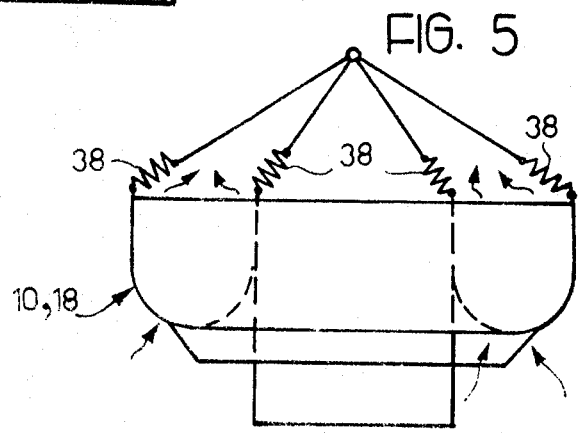
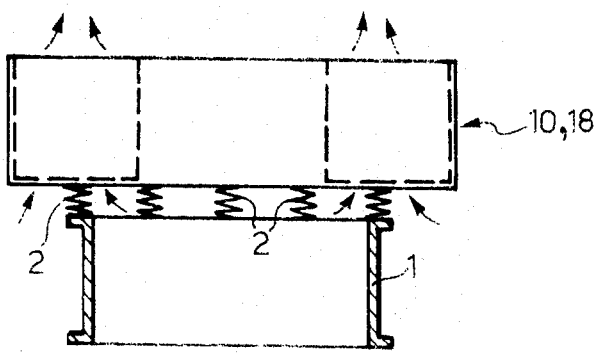
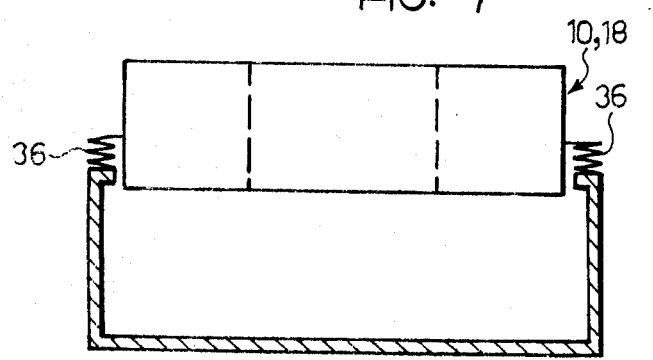

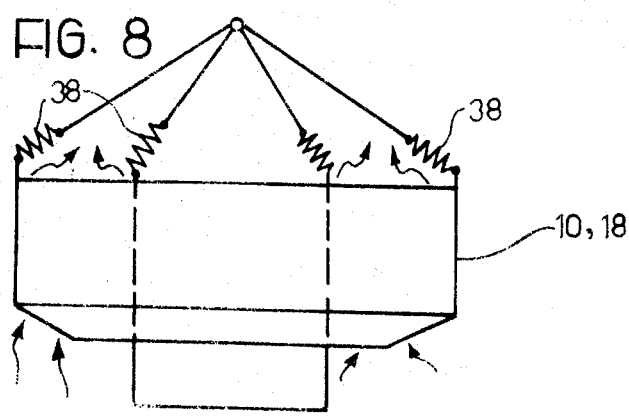
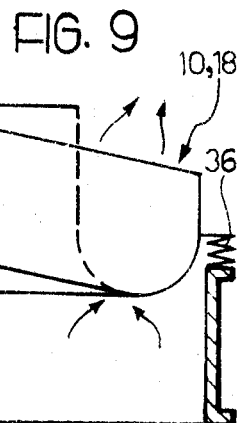
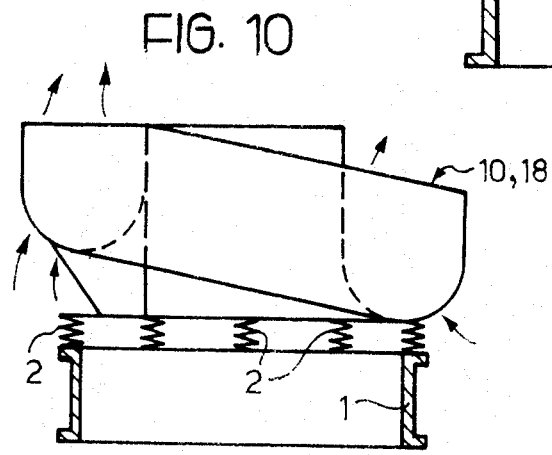
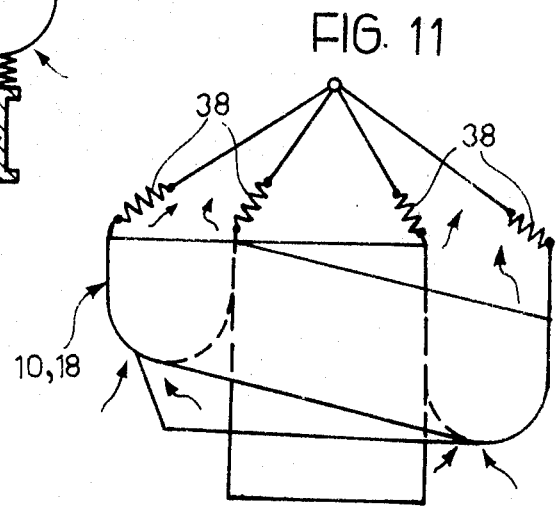

COATING MACHINE FOR CONFECTIONERY, PHARMACEUTICALS AND SIMILAR PRODUCTS

BACKGROUND OF THE INVENTION

1. Field of the Invention

The present invention relates to a machine for coating, and particularly for sugar coating articles of confectionery or pharmaceutical or like products, such as, for example, almonds, hazel-nuts, biscuits, chewing-gum or other such comestibles, or pastille tablets, pills or other pharmaceutical preparations. Known prior art sugar coating processes essentially comprise a first stage in which articles such as one of the above-mentioned products, are coated with a fluid or semifluid substance comprising, for example, a solution, suspension or mixture of sugar and starch, and a second stage in which drying and crystallizing of the applied coating take place. Generally this second stage is carried out by means of a current of air, frequently heated air, which is directed over the coated articles.

When sugar coating is performed on an industrial scale various problems have to be overcome if uniform products with predetermined characteristics and properties are to be obtained. For example, it is necessary for each article to be coated as completely and uniformly as possible with the coating substance so that the final coating has no surface discontinuity despite the inevitable discontinuities in the surfaces of the articles to be coated. Moreover, it is necessary to prevent the articles in contact with one another from sticking together during the drying and crystallization of the coating since they would otherwise adhere together and form lumps which would have to be scrapped.

For this purpose the articles to be coated are kept in continual movement while being sprayed with the coating substance, and simultaneously a current of air is directed over them until crystallization of the sugar coating takes place.

2. Description of the Prior Art

Known prior art machines for coating articles such as are mentioned above with sugar, comprise essentially a receptable of stainless steel or copper, which is rotatable about a horizontal axis or an axis inclined to the horizontal by not more than 45°. Receptacles of various shapes have been used, including cylindrical, spherical, egg-shape and cup-shape, receptacles.

Such a prior art receptacle has an aperture through which the articles to be sugar coated are loaded into the receptacle and, after treatment discharged from the receptacle, and is further provided with one or more ducts for feeding in the coating substance, and with one or more ducts for feeding in the air, which may be heated air, for the drying and crystallization of the coating. In operation of such a prior art machine the receptacle is loaded with a plurality of articles to be sugar coated, the quantity being such as will occupy only a small portion of the bottom of the receptacle. The receptacle is then rotated about its axis, and the articles therein are carried, in the same direction as the rotation, against the wall of the receptacle up to a certain height, after which they tumble over one another, returning to the bottom of the receptacle by rolling over the articles beneath, which are being carried along with the wall. Thus there is a continuous mixing of the article in the receptacle so that when a coating liquid is fed into the receptacle it is distributed over the articles by their tumbling action. Simultaneously with or subsequently to the intake of the coating substance, the container is fed with a current of air, possibly heated air, which by penetrating between the moving articles causes the required drying of the coatings.

Such prior art machines, although widely used, have a number of technical and economical disadvantages which have hitherto not been overcome. For satisfactory operation of such a machine it is necessary that the articles loaded into the container should occupy only a small fraction of the total volume thereof. Furthermore, because of the characteristic shape of the containers hitherto used, and because of the particular motion of the articles when being subjected to treatment in these containers, it is not possible to obtain good physical and thermal contact between the air blown in for the drying and all the articles to be dried, the air tends to pass over only those articles on the surface at any one time and not penetrating into the center of the batch of articles in the machine. Consequently, in order to achieve satisfactory results, prolonged drying times of the material are required so that the machine must remain in operation for considerable periods of time. These two factors combine to restrict the output and the efficiency of the machine to a rather low value. A further disadvantage of known prior art machines lies in that fact that the tumbling movement of the articles within the container results in each article suffering a number of impacts with adjacent articles with consequential damaging effects of deformation or fracture, making it necessary to scrap a certain proportion of the output.

Another disadvantage of the conventional prior art types of machines is the laborious nature in which loading and discharging of the articles to be treated takes place through the single opening of the substantially closed container. These operations require the stopping of the machine, and are effected manually, they are thus labour intensive operations in which operating time of the machine is lost, thereby being doubly disadvantageous.

SUMMARY OF THE PRESENT INVENTION

The present invention seeks, therefore, to provide a machine for sugar coating articles of confectionery, or pharmaceutical products and the like, in which the above mentioned structural and functional disadvantages of known prior art machines are overcome or at least substantially reduced.

According to the present invention, there is provided a machine for coating articles of confectionery, or pharmaceutical or like products, comprising a support structure on which is resiliently supported an annular receptacle having an upwardly open channel section, and a closable aperture in the side or bottom wall for the discharge of the finished product; and a vibration generator for causing the said annular receptacle to vibrate with respect to the said support structure.

Preferably at least the bottom of the said receptacle is perforated or has a mesh structure and the said annular receptacle is located within a container, the bottom of the receptacle and the container, are spaced apart, this space communicates with an air duct leading from a source of air under pressure. In a preferred embodiment the said container is upwardly open, all the surfaces of the said annular receptacle are perforated or of mesh structure, and the receptacle is rigidly attached to the said container which is resiliently mounted on the support structure and connected to the said vibration generator.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Various embodiments of the invention will now be more particularly described, by way of example, with reference to the accompanying drawings, which are given by way of illustration only, and thus are not limitative of the present invention, and wherein:

FIGS 4 to 11 are diagrams illustrating parts of various alternative embodiments of the invention;

DETAILED DESCRIPTION OF THE PRESENT INVENTION

Figure 1:
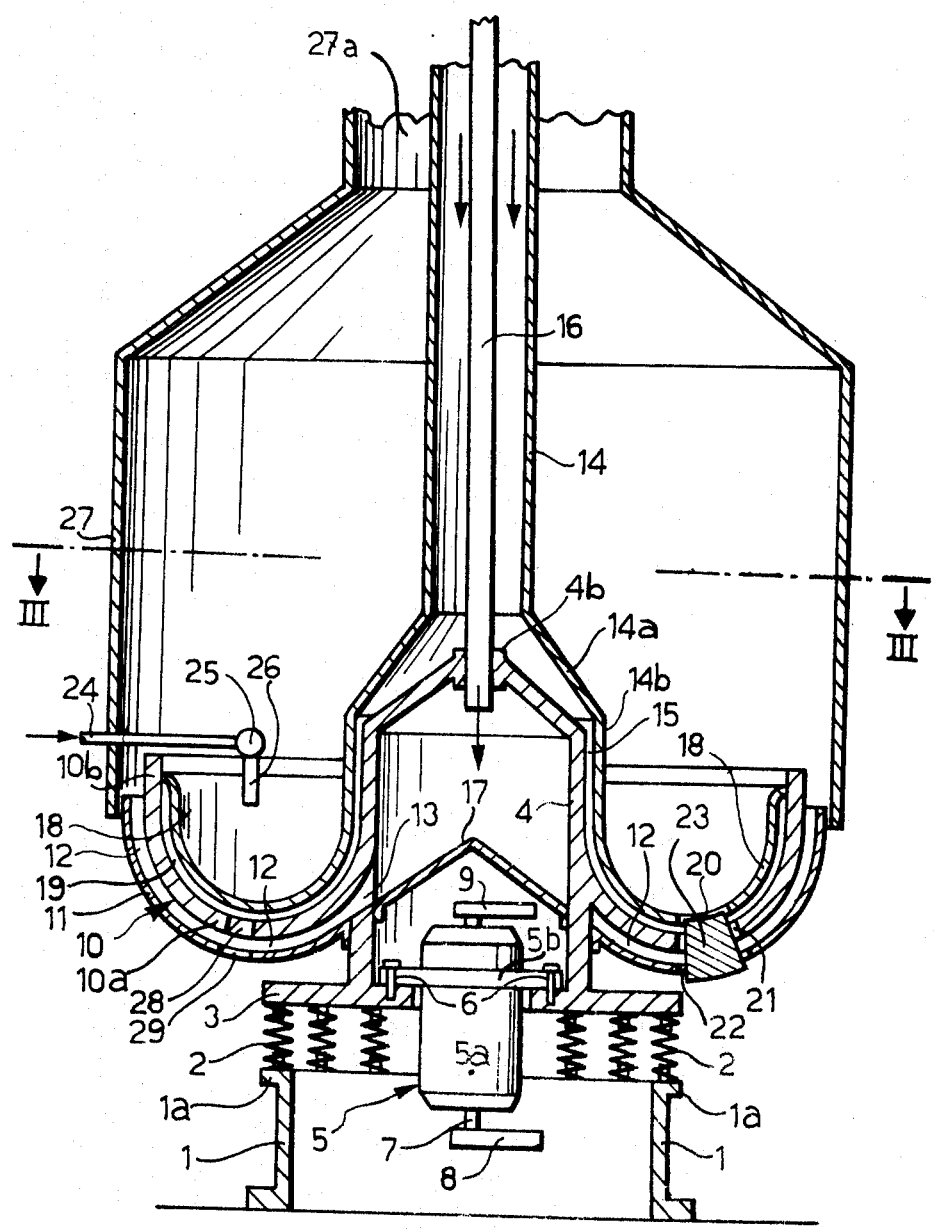
FIG. 1 is an axial section of a machine constructed as an embodiment of the present invention.
Figure 2:
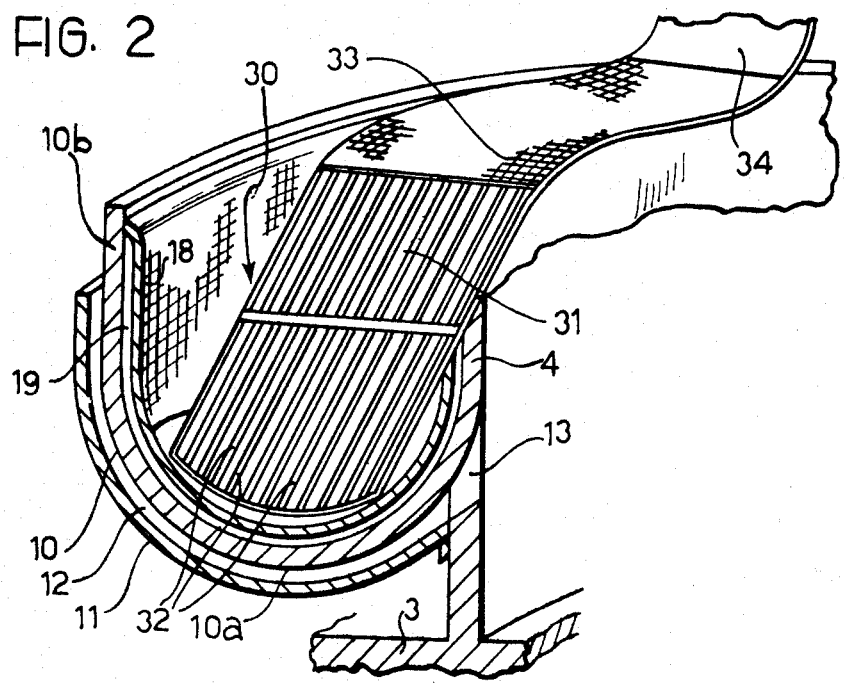
FIG. 2 is a sectioned schematic view, on an enlarged scale, of a part of the embodiment of FIG. 1.
Figure 3:
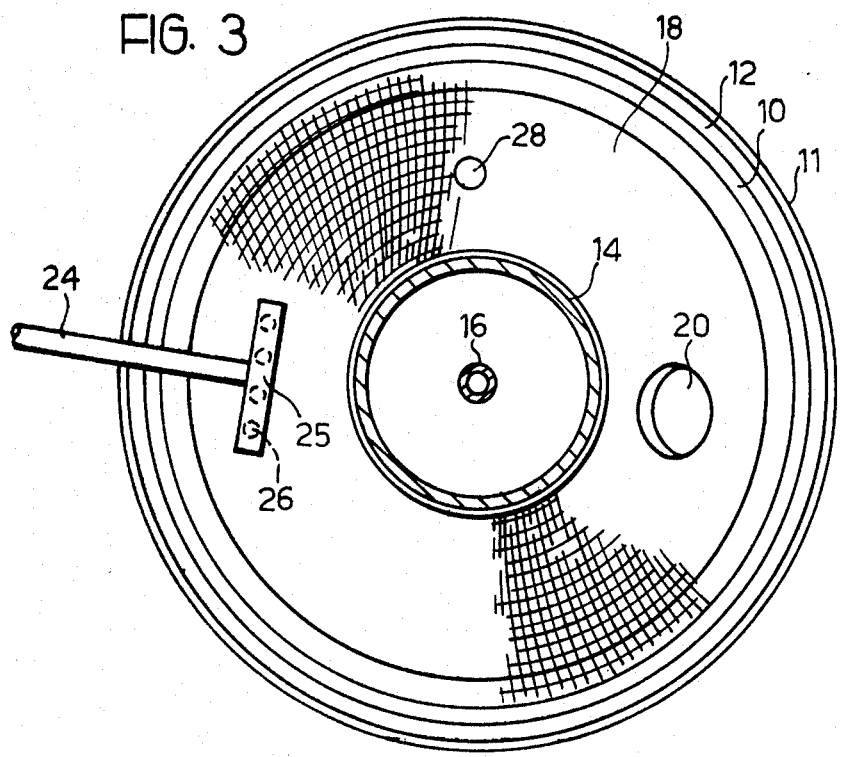
FIG. 3 is a sectional view taken on the line III—III of FIG. 1.

With reference first to FIGS. 1 to 3, the sugar coating machine illustrated has a support structure consisting essentially of a hollow cylindrical base 1 positioned with its axis substantially vertical. On the upper edge 1a of the cylinder 1 there are fixed a plurality of helical springs 2 jointly supporting an annular plate 3. To the annular plate 3 is secured a cylindrical body 4 which is coaxial therewith. The annular plate 3 also supports an electric motor 5, which is attached to the annular plate 3 by means of screws 6 passing through a radial flange 5b projecting from the casing 5a of the motor 5. In addition, the electric motor 5 inlcudes a vertical shaft 7.

The shaft 7 of the motor 5 is provided with eccentric weights 8, 9 so that when the said electric motor 5 is running the eccentric weights impart a vibration to the plate 3 and to the cylindrical body 4 which are resiliently supported by the springs 2.

Surrounding the cylindrical body 4 there is an annular container 10, having an upwardly open channel section. The inner wall of the container 10 is constituted by the cylindrical body 4, the bottom of the container 10 is constituted by a semicircular bottom wall 10a, and the outer wall of the container is constituted by a cylindrical wall 10b parallel to the wall of the cylindrical body 4. To the cylindrical body 4 and below the container 10, there is fixed an annular pan 11, having a cross section similar to that of the said container 10. Defined between the pan 11 and the container 10, is a space 12 which communicates with the interior of the cylindrical body 4 through a plurality of openings 13 (only one of which can be seen in FIG. 1) formed in the wall of the cylindrical body 4.

The cylindrical boby 4 has a conically tapered upper part which is connected by a sealing ring 4b to a vertical air duct 16 which is coaxial with the cylindrical body 4. Surrounding the air duct 16 is an outer air duct 14 the lower part of which is constituted by a truncated cone portion 14a widening downwardly, and a cylindrical portion 14b, which surrounds a part of the upper end of the cylindrical body 4. Between the lower portion 14b of the air duct 14 and the upper part of the cylindrical body 4 there is a space 15. The upper end (not shown) of the outer duct 14 is in communication with a source of compressed air (not shown) and means for heating the air (also not shown). The upper end (not shown) of the inner duct 16 is connected to a known device (also not shown) by means of which the inner duct 16 can be put into communication with the source of compressed air instead of the outer duct 14.

Within the cylindrical body 4 is fixed a deflector cone 17 which assists in directing into the space 12 between the container 10 and the pan 11 any air fed into the body 4 by the duct 16. In the said container 10 there is coaxially positioned an annular receptacle 18, having an upwardly open channel section, similar to the channel section of the said container 10. The receptacle 18 is fixed by its outer rim to the vertical wall 10b of the container 10, and by its inner rim to the lower end of the cylindrical portion 14b of the air duct 14. The receptacle 18 has a mesh or grid structure and defines between itself and the container 10 a space 19 which communicates with the space 15 between the cylindrical section 14b of the duct 14 and the cylindrical body 4. The mesh size of the receptacle 18 is such that the articles to be coated can be contained within the receptacle without falling through the mesh. In the bottom of the receptacle 18 there is an opening 20 through which the articles can be discharged when the coating and drying process is finished. There are corresponding aligned openings 21 and 22 in the container 10 and the pan 11, respectively. A conventional device 23, with an electromagnetic actuation unit is provided, for simultaneously closing or opening the apertures 20, 21 and 22.

A conduit 24 for feeding in the coating substance is supported in a known manner over the mesh receptacle 18. One end of this conduit 24 is in communication with a reservoir (not shown) containing the said coating substance, the other end is provided with a manifold 25, equipped with a plurality of delivery nozzles 26 directed towards the interior of the receptacle 18.

The sugar coating machine is also provided with a hood 27 for containing any sugar saturated water vapor produced during the operation of the machine, there being means for withdrawing this vapour through an opening 27a in the top of the hood 27 and for transferring it to means for recovering the coating substance carried by the said vapor. Such a recovery means may include, in a known way, a suction unit with condensers, filters, centrifugal dust extractors and separators, and similar devices which are not shown.

The operation of the sugar coating machine described above will be described with reference to an example of the sugar coating of almonds by means of an aqueous solution of sugar and starch: generally, at the start of each production cycle, the container 10 and the mesh receptacle 18 are preheated by feeding a current of hot air along the ducts 14 and 16 and into the spaces 12, 15 and 19. Subsequently, the components of the machine suspended on the springs 2, which comprise the plate 3, the cylindrical body 4, the container 10, the pan 11 and the mesh receptacle 18, are vibrated by operating the motor 5 to rotate the associated eccentric weights 8 and 9. The supply of pre-heating air is then stopped and the receptacle 18 is loaded with almonds until it is practically full. The charging of the receptacle 18 with almonds is easily and rapidly acchieved. Due to the vibration of the receptacle 18, it is only necessary to supply almonds into the receptacle 18 at one point, the vibration to which the receptacle is subjected causing them to spread around the receptacle. It has been observed that in operation of the machine, articles in the receptacle move along substantially helicoidal paths around the annular mesh receptacle 18, such movements ensure a continuous and uniform mixing of the articles with much softer impacts between them than they would be subjected to in sugar coating machines of the prior art.

The abovementioned vibration is continued while the almonds are sprayed with a predetermined amount of coating substance, fed through the conduit 24 to the multiple delivery nozzles 26.

Simultaneously with this spraying or after a predetermined period of time from the start of the spraying depending on the operational requirements, a current of air, generally heated, is fed along the duct 14 into the spaces 15 and 19. This current of air passes through the openings of the mesh receptacle 18 and permeates through the entire mass of moving almonds to effect the required drying and crystallisation of the coatings. The same air is then drawn upwards from the almonds through the outlet 27a in the hood 27 and convenyed to condensation and recovery devices (not shown) where the coating substance is recovered.

The continuous and uniform mixing of the articles during their continuous and uniform movement around the annular receptacle 18 by the vibration assists in ensuring uniformity in the distribution of the coating substance on each article. Moreover, the contact between the individual articles and the drying air is much improved over that of known machines so that the sugar coating and drying process can be completed in a considerably shorter time in the machine described herein than it could be when using the machines of the prior art. To this must be added the advantage of an increased output since the annular receptacle can be filled to a greater extent than could the corresponding receptacles of known prior art machines. Thus, for a given size of machine a greater number of articles can be sugar coated in a shorter space of time using the new machine described herein.

To obtain a finished product with a coating having the optimum predetermined characteristics generally requires a peroid of operation of the machine during which the current of heated air into the spaces 15 and 19 is interrupted, followed by a period during which a current of cold air, or at any rate unheated air, is fed in to cool the product before its discharge from the machine. This discharge is effected in a very rapid manner simply by operating the device 23 to open the apertures 20, 21, 22 while the machine continues to vibrate.

In the operation of the sugar coating machine of the present invention, not all of the coating substance sprayed onto the articles in the receptacle 18 actually adheres to the articles to form a coating thereon, some of the material passing as droplets into the spaces 15 and 19 where they are dried to a powder by the air flow. Some of this powder is carried along by the current of air which is constantly blown into the spaces 15 and 19, back into the mesh receptacle 18 containing the articles being coated, which articles are moving about due to the vibration. The dried powder adheres to the still damp coating of the articles and assists in preventing them from sticking together. The remainder of this dried coating substance in powder form, which is not carried up by the air flow, passes through the spaces 15, 19 and is discharged from the machine, together with any fragments of coated product, through one or more holes 28, 29 respectively provided in the bottoms of the container 10 and the pan 11.

Even with the improved action of the machine of the present invention there is an inevitable formation of lumps during a sugar coating process, such lumps being constituted by two or more articles stuck together by the sugar coating. In order to séparate these lumps from the individually coated articles use is made of a device 30 schematically shown in FIG. 2, and essentially comprising a baffle which can be inserted into the mesh receptacle 18. This baffle is formed by a number of parallel prongs 32 which form a comb having an arcuately curved lower edge which fits the profile of the bottom of the said mesh receptacle 18. The prongs 32 are regularly spaced by such a distance that a coated article can pass between them but a lump formed by two or more articles stuck together cannot.

The baffle 30 is inclined, in relation to the direction of movement of the articles in the mesh receptacle 18, so that the lumps which are trapped d by the baffle 30 are urged to move up it by the general movement of the articles in the receptacle. Above the baffle 30 there is fixed a flat overhanging sieve 33 the mesh size of which is such that an individual coated article can just pass therethrough and lumps of two or more articles stuck together are retained. The said sieve 33 terminates, at its end remote from the inclined baffle, in a solid plate 34, inclined so as to direct any lumps incident thereon outwardly from the machine. During the operation of the machine, the comb portion 30 of the baffle prevents the passage of any lumps which, by the vibration of the machine itself, are forced to move up the inclined prongs 32 until they arrive on the seive 33. As they travel over this sieve 33 any individual coated articles which may have been carried up with the lumps can fall through the sieve 33. Any lumps which consist of two or more articles stuck together by the coating material are deflected by the inclined deflector plate 34.

In the preceding description of the embodiment of FIGS. 1 to 3 the assembly constituted by the annular plate 3, the cylindrical body 4, the annular container 10, the mesh receptacle 18, and the pan 11, which assembly is caused to vibrate by the motor 5 with eccentric rotating weights 8, 9 when the machine is operating, is supported by a number of vertical compression springs 2 disposed between the annular plate 3 and the base 1 of the machine itself. In other embodiments of the present invention shown in FIGS. 4 to 11 various different suspension arrangements are employed as well as various other modifications with respect to the embodiment described with reference to FIGS. 1 to 3.

In FIG. 4 there is shown, schematically, a machine having an annular container 10 and receptacle 18 directly supported by compression springs 36 spaced around the periphery thereof and carried by a cylindrical base 37 of suitable dimensions. In place of compression springs closed pneumatic cylinders could be used. In FIG. 5 there is shown an embodiment in which the container 10 and receptacle 18 are suspended by springs 38 extending above the container 10 and receptacle 18 of the machine, and supported by a column or load-bearing structure (not shown). In this embodiment a cylindrical base such as the base 37 in FIG. 4 is not necessary.

FIGS. 6, 7 and 8 illustrate further embodiments of the present invention in which the channel section of the container 10 and the mesh receptacle 18 are essentially of rectangular shape. In these embodiments the suspension springs 2 may be mounted directly under the container 10 as shown in FIG. 6, or alternatively springs 36 may be attached to the outer peripheral wall of the container 10 as in the embodiment of FIG. 7, or tension springs 38 may be used to suspend the container 10 from above is in FIG. 8.

FIGS. 9, 10 and 11 show schematically further embodiments of the present invention in which the channel section container 10 and the mesh receptacle 18 arranged within it are in the form of a part of a helix. In these embodiments of the present invention the resiliently suspended parts of the machine way be supported by resilient suspensions, either springs or pneumatic cylinders, disposed in the three variation as described above in relation to FIGS. 4 to 8.

The invention being thus described, it will be obvious that the same may be varied in many ways. Such variations are not to be regarded as a departure from the spirit and scope of the invention, and all such modifications as would be obvious to one skilled in the art are intended to be inclined within the scope of the folowing claims.

I claim:

1. A machine for coating articles of confectionery, or pharmaceutical or like products, said machine comprising:
    a support structure;
    an annular receptacle having a bottom and an upwardly open channel section;
    means defining a closable discharge aperture in one wall of said receptacle, said closable discharge aperture serving, when open, for the discharge of articles from said annular receptacle;
    resilient suspension means interconnecting said annular receptacle and said support structure;
    vibration generator means operating to cause said annular receptacle to vibrate with respect to said support structure;
    at least the bottom of said receptacle is perforated or has a mesh structure;
    a container surrounding and locating the said annular receptacle such that there is a space between said bottom of said receptacle and said container;
    an air duct communicating with said space between said bottom of said receptacle and said container; and
    a source of air under pressure connected to said air duct, whereby in use of said machine air can be blown into said space between said perforated or mesh structure bottom of said receptacle and said container.

2. The machine of claim 1, wherein said container is upwardly open, all the surfaces of said annular receptacle are perforated or of mesh structure, and said receptacle is rigidly attached to said container;
    means resiliently mounting said container on said support structure; and
    means connecting said container to said vibration generator.

3. The machine of claim 2, wherein said container is annular and has an upwardly open channel section corresponding to that of said receptacle.

4. The machine of claim 1, wherein said container has a discharge aperture in a position corresponding to that of said discharge aperture in said receptacle, there being means for simultaneously closing or opening both said apertures.

* * * * *

UNITED STATES PATENT AND TRADEMARK OFFICE
CERTIFICATE OF CORRECTION

PATENT NO. : 4,050,406

DATED : September 27, 1977

INVENTOR(S) : Mario RENI

It is certified that error appears in the above-identified patent and that said Letters Patent are hereby corrected as shown below:

IN THE HEADING OF THE PATENT ADD THE FOLLOWING:

--[30] Foreign Application Priority Data
February 5, 1976 Italy 19920/76

Signed and Sealed this

Twentieth Day of June 1978

[SEAL]

Attest:

RUTH C. MASON
Attesting Officer

DONALD W. BANNER
Commissioner of Patents and Trademarks